United States Patent [19]
Zirlis

[11] 3,780,867
[45] Dec. 25, 1973

[54] WATER PURIFICATION APPARATUS AND CARTRIDGE THEREFOR

[75] Inventor: Joseph V. Zirlis, Branford, Conn.

[73] Assignee: H. N. Industries Inc., New Haven, Conn.

[22] Filed: Dec. 27, 1971

[21] Appl. No.: 212,029

[52] U.S. Cl.............................. 210/266, 210/282
[51] Int. Cl............................................. B01d 27/02
[58] Field of Search................. 55/316; 210/266, 210/282, 315, 440, 443, 444, 458, 484, 489, 490, 503, 483, 488, 499

[56] References Cited
UNITED STATES PATENTS

| | | | |
|---|---|---|---|
| 3,705,651 | 12/1972 | Klein | 210/266 |
| 2,517,753 | 8/1950 | Ximenex et al. | 210/490 |
| 3,529,726 | 9/1970 | Keenan | 210/282 X |
| 3,262,570 | 7/1966 | Gailitis et al. | 210/266 |
| 3,289,847 | 12/1966 | Rothemund | 210/266 |

Primary Examiner—Frank A. Spear, Jr.
Assistant Examiner—Robert H. Spitzer
Attorney—Anthony P. Delio et al.

[57] ABSTRACT

Two-stage water purification apparatus having a cartridge disposed within a housing provided with a removable cap. The cartridge comprises a casing containing activated charcoal, two superposed grid-like sleeves surrounding the casing, and a diatomaceous earth layer between the two sleeves. Incoming water circulates from an inlet port in the cap through the outermost sleeve to the interior of the cartridge, and then out through an outlet port in the cap.

14 Claims, 1 Drawing Figure

PATENTED DEC 25 1973 3,780,867
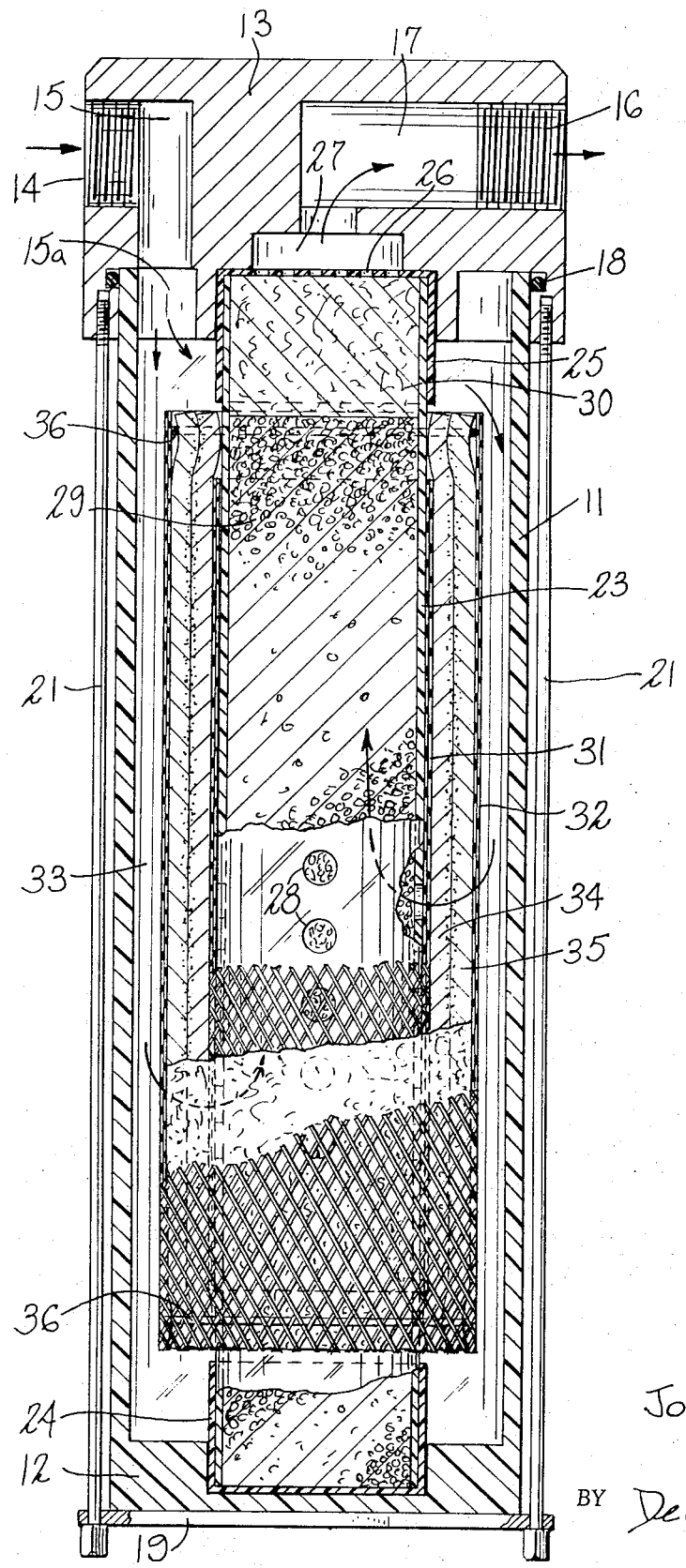
INVENTOR
Joseph V. Zirlis
BY DeLio and Montgomery
ATTORNEYS

WATER PURIFICATION APPARATUS AND CARTRIDGE THEREFOR

BACKGROUND OF THE INVENTION

This invention relates to water purification apparatus and replaceable treatment cartridges therefor, and particularly to two-stage water purification apparatus adapted for insertion in potable water conduits in single or multi-family dwellings.

With increasing population and industrial development, potable water supplies to urban and suburban dwellings have tended to become polluted. Even in those communities in which the water is treated to reduce the levels of pollution, residual pollution and/or the presence of additives such as chlorine and the like have changed the character of the water from its natural taste, odor and appearance so as to provide only marginal acceptability to the average householder. The reduced quality of the water also deleteriously affects, of course, the preparation of food as well as the drinking water.

An auxiliary water purification apparatus which is simple in construction, economical, and easily inserted into a potable water supply line of the average household would therefore be a significant benefit. While numerous of such devices are known, either they are not effective in one or more of filtering out suspended matter and improving color, taste and odor, or the apparatus devised to improve or control all of these qualities is unduly complex and expensive for use in the average household.

OBJECTS AND SUMMARY

Accordingly, an object of the invention is to provide a new and improved water purification apparatus which in a single compact unit will improve taste, odor and color as well as filter out polluting, particulate or suspended matter.

Another object of the invention is to provide new and improved water purification apparatus which is simple in design and economically adaptable for use in the average household.

Still another object of the invention is to provide a new and improved cartridge for auxiliary water treating apparatus, which combines therein various water treating functions and reagents therefor, for improving the color, taste and odor of drinking water as well as for removing finely divided particulate matter, whereby replacement of such cartridges revitalizes the apparatus.

These and other objects, features and advantages of the invention will in part be obvious and will in part be apparent from the specification which follows.

In summary outline, the water purification apparatus includes an elongated housing having a water inlet port and a water outlet port, in which is incorporated a cartridge comprising an elongated casing adapted for flow of water from the outside to the interior, and then out one end for exit through the outlet port of the housing. The casing of the cartridge contains an activated charcoal medium as one water treatment stage. Surrounding the casing are two superposed sleeves comprising mesh of a gauge effective to retain coarse particular matter in water flowing therethrough. A diatomaceous earth layer between the two stages defines another water treatment stage.

The invention accordingly comprises the features of construction, combinations of elements and arrangements of parts which will be exemplified in the apparatus and cartridge hereinafter set forth, and the scope of the invention will be indicated in the claims.

DETAILED DESCRIPTION

For a fuller understanding of the nature and objects of the invention, reference is made to the following description taken in conjunction with the accompanying drawing which is a vertical cross-section of apparatus of the invention, illustrated approximately to actual scale, and with certain portions broken away to show underlying structure.

With reference to the drawing, the apparatus of the invention includes a housing 11 having a bottom end 12, which preferably is unitary with the side walls of the housing, and a top end preferably comprising a removable head or cap member 13. A high impact strength, substantially transparent plastic, such as acrylic, is preferred as material for the housing.

The water inlet and outlet ports of the housing 11 may be formed anywhere in the housing where it would be convenient to connect water supply lines but preferably they are provided as cutouts in the cap member 13 as an inlet port 14 and connecting inlet channel 15, and an outlet port 16 and connecting outlet channel 17. Each port may be internally screw threaded for connection to water lines. Cap member 13 may be internally threaded and the top end of housing 11 may be externally threaded for screw attachment, or cap member 13, as shown, may be adapted for a press fit on one end of housing 11. In either case, a gasket such as an O-ring 18 is inserted at the point of contact to seal the cap member 13 against the outer wall of the housing 11. In the case of a press fit, the cap member 13 is held on the housing 11 by a pressure plate 19 connected to the cap member 13 through a plurality of tie rods 21 each of which are threaded at one end for screw connection to the cap member 13, the other ends of the tie rods 21 having nuts unitary therewith. The tie rods are inserted through holes provided in the pressure plate 19.

The pressure plate and tie rods are preferably formed of a non-corrosive metal such as stainless steel, and the cap member may be formed of heavy-duty plastic or of a metal such as aluminum.

Disposed within the housing 11 is a removable cartridge having an elongated casing 23. The bottom end of the casing 23 is closed, for example, with a cap member 24. The bottom end is centrally seated in a cutout in the bottom end 12 of the housing 11. The top end of the casing 23 is apertured, and preferably comprises a cap 25 which is press-fitted or otherwise affixed to the walls of the casing. The top end or cap 25 is positioned in a cutout in the cap member 13 to assist central positioning of the casing within the housing 11. The apertures 26 of the cap 25 communicate with a head space 27 in cap member 13 which in turn communicates with the outlet channel 17 and outlet port 16. The casing 23 is formed of a solid, water impermeable material, preferably a durable, substantially transparent plastic such as butyrate, and has apertures 28 in the walls thereof for passage of water therethrough to its interior. The casing 23 provides a reservoir for activated charcoal particles 29. The activated charcoal particulate filtering medium may completely fill the casing 23 but preferably the upper, outlet end of the casing is packed with a "final filter" material 30 such as cotton or felt.

The final filter material also prevents loss of the activated charcoal particles, or clogging, of the apertures 26.

Surrounding the casing 23 are two superposed sleeves 31 and 32 forming grid work or mesh of sufficient gauge to filter coarse particulate matter from the incoming water. However, the primary functions of the sleeves are to help support an adjacent diatomaceous earth medium and to channel the flow of water, as will become apparent. In a preferred embodiment, each of the sleeves 31 and 32 is formed of at least two layers of parallel strands of a material such as polyethylene plastic, the layers being superposed such that the strands of any one layer are angularly disposed with respect to the strands of the next adjacent layer, in crisscross fashion. This arrangement is preferred to interweaving of the strands since it provides channels parallel to the strands for flow of water, and thus promotes water flow through the sleeves to the interior of the cartridge. Between the outer sleeve 32 and the inner wall of the housing 11 is a flow space 33 for distribution of water along the entire length of the cartridge.

Between the sleeves 31 and 32 is a diatomaceous earth filter medium preferably comprising fibrous layers 34 and 35 supporting diatomaceous earth. Polypropylene felt is preferred as the fibrous material due to its long filtering life but other materials will also be suitable. The diatomaceous earth filtering medium is supported and concentrated at the interface of the two fibrous layers but may also impregnate the layers. The fibrous layers 34 and 35 may be supported on the inner sleeve 31 by any suitable means, such as wires, clips or rubber bands 36.

While the sleeves 31 and 32 and fibrous layers 34 and 35 are shown as discrete but integral elements of the cartridge, it will be understood that the sleeves may be in the form of enveloping bags, socks or may have other dimensions effective for the functions contemplated. Suitable structure may be provided in the cap member 13 for a swirling action of the water as it enters the apparatus, for enhancement of flow and prevention of clogging within the apparatus and cartridge. Moreover, although tubular or cylindrical configurations of the housing 11 and the elements of the cartridge are preferred, other shapes and configurations will be suitable if equivalent water flow and treatment is provided.

Any form of activated charcoal, whether finely divided or a coarse particulate, may be employed as the inner filtering medium of the apparatus, and a variety of such materials are commercially available. Preferred is a coarse particulate material which selectively adsorbs non-polar high molecular weight impurities and excess water treatment additives such as chlorine. Activated charcoal is used also for its property of improving taste, color and odor of the water flowing therethrough. One such activated charcoal material is a product manufactured by Witco Chemical Co. as "Witco Activated Carbon Grade 718". The diatomaceous earth medium is especially effective in the removal of fine particulate matter in the water passing therethrough, including dirt and rust, and a variety of grades are commercially available for this purpose.

For operation of the apparatus, the cap member 13 is inserted in a potable water supply line such that the water flow is in the direction of the arrows in the drawing. The water flows through inlet port 14 downwardly through channel 15 to the annular space 15a, and then into the annular space 33 between the inner wall of the housing 11 and outer sleeve 32 of the cartridge. The water passes through sleeve 32 to the interior of the cartridge, with heavy particulate matter being retained on sleeve 32. The finely suspended particulate matter in the water is removed by the diatomaceous earth and fibrous layers 34 and 35, which together define a first water treatment stage of the apparatus and cartridge. The water then flows through apertures 28 of casing 23 and over the activated charcoal particles within the casing 23, where the physical and/or chemical changes characteristic of activated charcoal are effected. Thereby, the color, odor and taste of the water are substantially improved. The activated charcoal medium thus defines a second water treatment stage. The water then flows upwardly through final filter medium 30 and then out of the cartridge through outlet port 16 of cap member 13. As a result of such treatment, the water flowing from a connecting tap will be found to be substantially improved in general appearance as well as taste and odor.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a cartridge for a water purification apparatus, the combination of:
   an elongated casing formed of a water impervious material and containing an activated charcoal filter medium, wherein at least one end of said casing is perforated for exit of purified water therefrom, and wherein the walls of said casing are perforated for entry of water therethrough,
   two superposed grid-like sleeves surrounding said casing, wherein each of said sleeves is defined by a grid of at least two layers, each said layer being formed of parallel strands, said layers being superposed such that the strands of any one layer are angularly disposed with respect to the strands of the next adjacent layer, whereby channels are provided for flow of water parallel to said strands, and
   a layer between said sleeves, comprising a diatomaceous earth filter medium.

2. A cartridge as in claim 1 wherein said layer of diatomaceous earth filter medium includes a fibrous material to support said diatomaceous earth in said casing.

3. A cartridge as in claim 1 wherein said sleeves comprise mesh of a gauge effective to retain coarse particulate matter in water flowing therethrough.

4. A cartridge as in claim 1 wherein the lengths of said sleeves and said layer of diatomaceous earth filter medium are short of the length of said casing, whereby the ends of said casing are adapted to be received in a recess in a housing for said cartridge.

5. A cartridge as in claim 1 further including a fibrous filtering medium positioned in said perforated exit end.

6. A cartridge as in claim 1 wherein said casing and said sleeves are formed of a plastic material.

7. In a water purification apparatus, the combination of:
an elongated water impermeable housing having a water inlet port and a water outlet port, and
a cartridge as defined in claim 1 positioned interiorly of said housing, wherein the exit end of said cartridge communicates with said outlet port.

8. Water purification apparatus as in claim 7 whrein the inlet port and outlet port are positioned in the same end of said housing, and the other end of said housing is closed and has a recess for receiving an end of said cartridge and centrally positioning said cartridge in said housing.

9. Water purification apparatus as in claim 7 wherein one end of said housing has a removable cap member thereon, and wherein said cap member has a pair of openings therethrough defining said inlet port and said outlet port.

10. Water purification apparatus as in claim 9 wherein said cap member is adapted to support said cartridge centrally within said housing.

11. Water purification apparatus as in claim 10 wherein said cap member is adapted for a press-fit onto said housing, said apparatus including means for retaining said cap member on said housing.

12. Water purification apparatus as in claim 11 wherein said retaining means comprises a plate member positioned below the end of said housing opposite said cap member, and a plurality of rods connecting said plate member to said cap member.

13. Water purification apparatus as in claim 7 wherein said housing is formed of a substantially transparent plastic material, and said housing and cartridge are cylindrical.

14. Water purification apparatus as in claim 13 including an annular channel between said housing and cartridge and longitudinal thereof, for flow of water throughout said apparatus.

* * * * *

UNITED STATES PATENT OFFICE
CERTIFICATE OF CORRECTION

Patent No. 3,780,867  Dated December 25, 1973

Inventor(s) Joseph V. Zirlis

It is certified that error appears in the above-identified patent and that said Letters Patent are hereby corrected as shown below:

In the abstract, before the last sentence add the following: -- The grid-like sleeves each have at least two layers of parallel strands, the strands in one layer being angularly disposed with respect to the strands of the next adjacent layer so that channels are provided for flow of water parallel to the strands. --

Signed and sealed this 21st day of May 1974.

(SEAL)
Attest:

EDWARD M. FLETCHER, JR.  C. MARSHALL DANN
Attesting Officer  Commissioner of Patents